Aug. 19, 1969  P. A. M. DE VALROGER  3,462,100
PNEUMATIC LIFTING PLENUM CHAMBER FOR VEHICLES
Filed Feb. 20, 1967
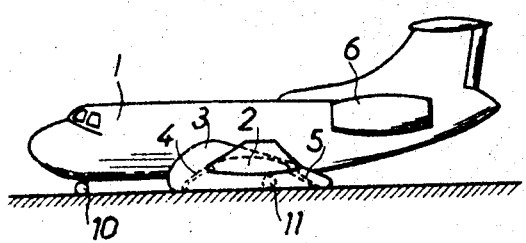
Fig.: 1
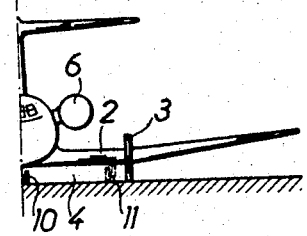
Fig.: 2
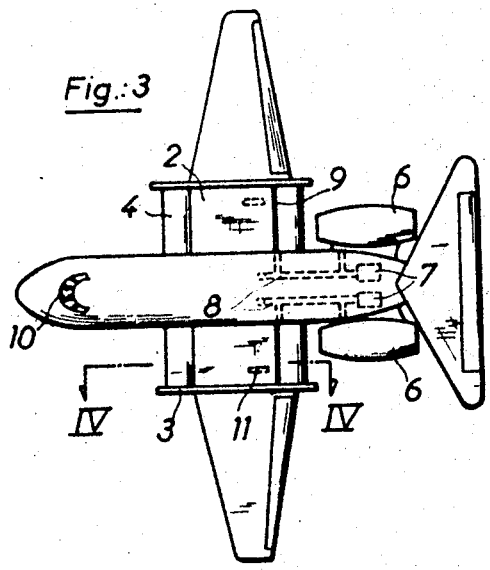
Fig.: 3
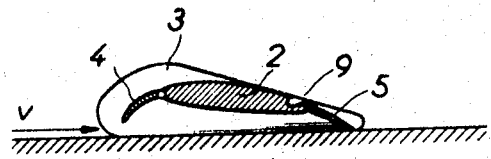
Fig.: 4

Fig.: 5
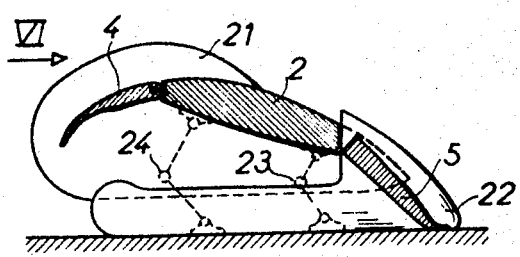
Fig.: 6
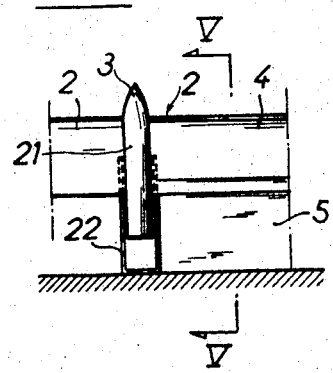
Fig.: 7
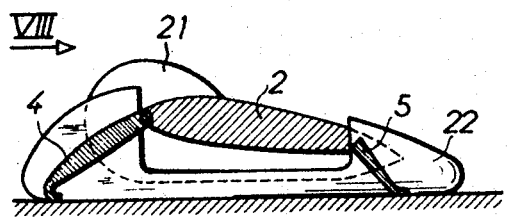
Fig.: 8
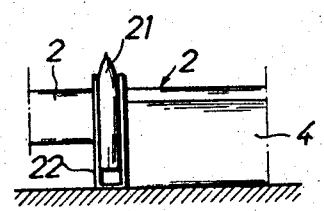
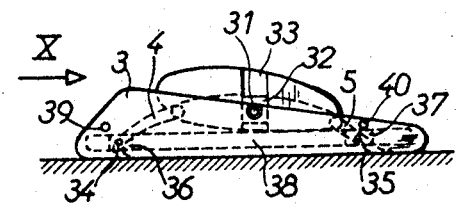
Fig.: 9
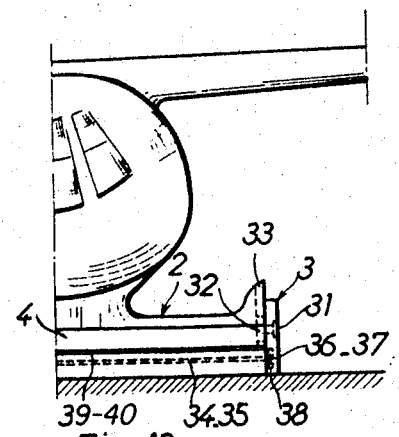
Fig.: 10

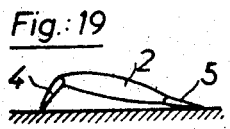
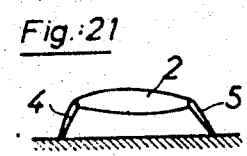
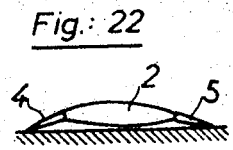
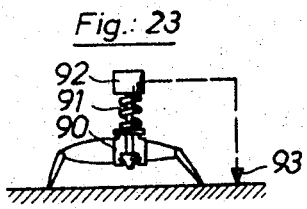
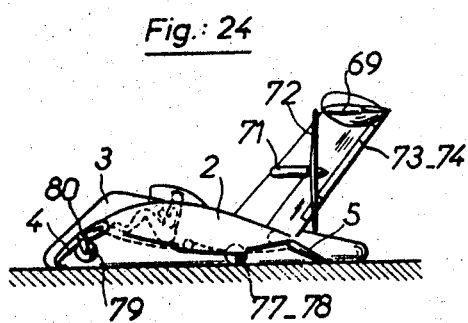
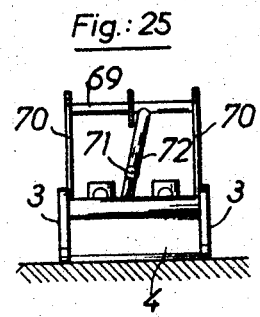
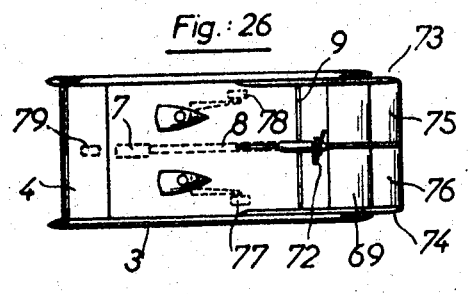

United States Patent Office 3,462,100
Patented Aug. 19, 1969

1

3,462,100
PNEUMATIC LIFTING PLENUM CHAMBER
FOR VEHICLES
Pierre Albert Marie De Valroger, 21 Rue Saint-
Guillaume, Paris, France
Filed Feb. 20, 1967, Ser. No. 617,412
Claims priority, application France, Feb. 21, 1966,
50,429, Patent 1,469,450; Sept. 27, 1966, addi-
tion 77,793
Int. Cl. B60v 3/08; B64c 25/00
U.S. Cl. 244—100                              8 Claims

ABSTRACT OF THE DISCLOSURE

A pneumatic plenum chamber as a lifting support chiefly adapted for the taking off and landing of aircrafts on fluid cushions. The plenum chamber is bounded upwardly by the lower surface of the aircraft wing, laterally by longitudinal partitions and to the fore and aft by movable flaps in fluid-tight contacting relationship with the partitions. At the moment of the landing, said flaps and partitions engage the ground fluid-tightly. The partitions are expansible in their own plane, so that they may always rest on the ground when the height of the aircraft above ground and its angle of incidence vary. The flaps are kinematically connected with one another in a manner such that opening of one of them produces closing of the other.

Background of the invention

*Field of the invention.*—The invention relates to the lifting by fluid cushions of vehicles and chiefly of aircrafts at the moment of their taking off and of their landing.

*Description of prior art.*—It is a well-known fact that the taking off and landing of aircrafts are normally executed by means of wheeled undercarriages. Such arrangements show various drawbacks ascribable in particular to the particularly high weight of the undercarriage and of its reinforcing means, to the high pressure exerted on the ground which requires the use of resistant and costly runways and to a very speedy wear of the tires of the undercarriage, chiefly under the action of a skidding of the aircraft when the wind is not alined with the runway and the aircraft has a tendency to progress crabwise when landing.

It has already been proposed to remove said drawback by cutting out the conventional undercarriage and by causing the aircraft to take off and land on an air cushion.

Said known arrangements show however drawbacks ascribable to a defective fluid-tightness of their component elements with the ground, whereby there appears a leak which may be somewhat considerable. Such a leak reduces as well-known in the art the efficiency of the air cushion which cannot consequently damp to a sufficient extent the downward speed assumed by the aircraft when engaging ground.

Furthermore, the substantially constant presence of an important leak requires the presence of a powerful fluid feeding device operating under poor conditions of efficiency and which is therefore generally expensive.

Summary of the invention

The object of the invention is to provide pneumatic lifting means for a vehicle when in proximity with the ground, which means cut out or at least considerably reduce such leaks which are detrimental to the proper operation and efficiency of the arrangement.

The lifting air cushion inside the plenum chamber or housing forming the chief portion of the arrangement

2 is closed to this end along its sides two longitudinal expansible partitions bestowed each with at least one and preferably two degrees of freedom with reference to the vehicle so that they may occupy each an infinite number of positions while remaining constantly in the same plane, and is closed fore and aft by two movable transverse partitions engaging substantially fluid-tightly the longitudinal partitions, said transverse partitions being kinematically connected with one another in a manner such that the opening of one of them produces the closing of the other and conversely.

Such an arrangement allows the vehicle to move vertically with reference to the ground or to assume a variable angle of incidence with reference to the ground without the contact between the ground and the partitions being cut out at any moment, whereby the fluid-tightness of the pneumatic lifting chamber is consequently retained permanently.

Such an arrangement associated with further features to be described hereinafter cooperates efficiently in the formation of a fluid-tight pneumatic lifting chamber showing a capacity of damping the downward movement of the vehicle which is far superior to that of conventional fluid cushions.

Brief description of the drawings

FIG. 1 is a diagrammatic lateral elevational view of an aircraft provided with a penumatic lifting plenum chamber incorporating the invention.

FIG. 2 is a front view of one half of the aircraft illustrated in FIG. 1.

FIG. 3 is a view from above of the aircraft illustrated in FIG. 1.

FIG. 4 is a cross-section along line IV—IV of FIG. 3.

FIG. 5 is a diagrammatic cross-section in a plane perpendicular to the span of the aircraft of a lifting chamber executed in conformity with the invention.

FIG. 6 is a front view in the direction of the arrow VI of FIG. 5.

FIG. 7 is a view similar to FIG. 5 of a modified lifting chamber.

FIG. 8 is a view of said modified chamber in the direction of the arrow VIII of FIG. 7.

FIG. 9 is a lateral elevational view of a further modified lifting chamber.

FIG. 10 is a view of the latter in the direction of the arrow X of FIG. 9.

FIGS. 19 to 22 are diagrammatic views illustrating the operation of the lifting chamber for different angles of incidence and for different heights of the aircraft with reference to ground.

FIG. 23 discloses an arrangement for adjusting the pressure prevailing in the lifting chamber.

FIG. 24 is a diagrammatic lateral elevational view of a vehicle adapted to be equipped with a lifting chamber executed in conformity with the invention.

FIG. 25 is a front view of the vehicle illustrated in FIG. 24.

FIG. 26 is a view from above of the vehicle illustrated in FIG. 24.

Description of the preferred embodiments

Figure 11:
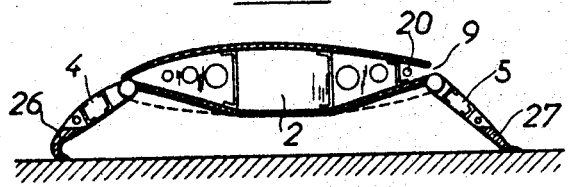
FIG. 11 is a cross-section in a plane perpendicular to the span of the aircraft of a lifting chamber showing the fluidtight means provided at the fore and aft of the chamber.

FIGS. 1 to 4 show an aircraft 1 with a low wing wherein the main or rear landing undercarriage is replaced by a chamber located under the aircraft and opening towards the ground. Said chamber is upwardly bounded by the lower surface of the central section of the wing 2. It is laterally closed by partitions 3 located symmetrically with reference to the longitudinal axis of the aircraft and projecting possibly above the upper surface of the wing so as to act also as fins or stalling partitions. Lastly, the chamber is transversely bounded to the front by a partition or slat 4 and to the rear by a flap or partition 5 fluid-tightly engaging the longitudinally extending partitions 3. The lateral partitions 3 are illustrated only in a diagrammatic manner in FIGS. 1 to 4 and their accurate structure will be disclosed hereinafter with reference to FIGS. 6 to 10; the slat 4 and rear flap 5 act furthermore as high-lift means. As disclosed hereinafter the partitions 3 may be deformed or shifted when the aircraft is about to land at a varying height or with a varying angle of incidence. The front slat 4 and rear flap 5 are pivotally secured so that their angular setting may be adjusted according to the desired distance to be given to them with reference to ground. There is thereby obtained a chamber of a generally rectangular shape which forms the pneumatic lifting chamber referred to hereinafter.

At the end of the taking off and at the beginning of the landing, the aircraft shows generally a positive angle of incidence such that the extreme portion of the rear flap 5 and also the shoes provided along the lower edges of the longitudinal partitions 3 may be in contact with ground. In contradistinction, the extreme edge of the slat 4 may lie at a certain height above ground, as illustrated in FIG. 4. Under such conditions, the rectangular chamber is closed only along three sides and is fed along its fourth or front end with compressed air, as provided by the speed of progression of the aircraft entering the rectangular diffuser constituted by the ground cooperating with the lower edge of the slat 4 and bounded laterally by the partitions 3. There is thus obtained inside the chamber a fluid cushion ensuring the lifting of the aircraft for such special conditions of operation.

When the speed V of the aircraft is reduced and the dynamic pressure is no longer sufficient for ensuring the desired lift, auxiliary feeding means are resorted to for inflating the chamber. Said feed may be ensured for instance by removing air or gas out of jet engines 6 propelling the aircraft or else by means of independent gas generators 7. As illustrated in FIGS. 3 and 4, the auxiliary channels 8 feeding the chamber may as well be connected with air slots 9 extending in the usual manner along the upper surface of the flap 5, so as to increase the lift of the wing. The auxiliary means feeding the chamber may be started before landing and be retained for a short time after the taking off. For this auxiliary feed to be efficient, it is important that the chamber may be completely closed. It is sufficient to this end to bring the lower edge of the slat 4 into contact with the ground and this is obtained by reducing the angle of incidence of the aircraft which occupies then the position illustrated in elevational view in FIG. 1. The chamber may thus serve for ensuring a complete support for the aircraft 1. It is then possible to make the latter progress crabwise over the ground, which allows it to take off and land even in the presence of a transverse wind.

However, if no propellers are available which are adapted to readily exert a thrust in any direction whatever it is often preferably to retain wheels absorbing a slight fraction of the weight of the aircraft, so as to ensure stability for the latter when running over ground. Said wheels may be constituted by those of a conventional undercarriage including a front section 10 and a rear section 11, which latter may be highly simplified and of a very light weight since the part it has to play is purely ancillary, in particular with a view to furthering the running of the aircraft into its shed when the blast of fluid entering the chamber has been brought to an end.

In order to completely close the pneumatic lifting chamber when the height of the wing above ground and/or its angle of incidence vary, it is necessary to provide at the same time for a lateral closing of the chamber. To this end, the longitudinal partitions 3 are movable with at least one end preferably two degrees of freedom.

An embodiment of such a partition is illustrated in FIGS. 5 and 6. Each partition 3 includes as illustrated two sections fitted inside each other. The upper section 21 fluid-tightly carried by the wing 2 engages the slat fluid-tightly.

The lower section 22 of the partition slidingly carried by the section 21 cooperates fluid-tightly with the flap 5 and is flush with the ground. Two knuckle joints 23 and 24 allow the lower section 22 to move with reference to the wing in a plane perpendicular to the span of the latter while opposing the deformations which may arise under the action of the higher pressures prevailing in the chamber. It is apparent that the section 22 may occupy in its plane an infinite number of positions as a consequence of translational movements along a direction in the plane of said section showing a vertical component and/or of a rotary movement round an axis perpendicular to said plane. The section 22 may thus accompany both a vertical shifting of the wing and consequently of the aircraft and furthermore a modification in the angle of incidence of said wing. The lateral fluid-tightness of the chamber is thus retained for highly different conditions of operation.

With the arrangement disclosed, the lifting chamber is closed to the front only for an angle of incidence which is substantially equal to zero. The pressure prevailing at the landing and which should damp the residual downward speed upon engagement with the ground is equal, at the utmost to the dynamic pressure. Said pressure may however be insufficient in the case of slowly landing aircrafts.

FIGS. 7 and 8 illustrates a modification of the preceding arrangement, which modification is intended to remove last-mentioned drawback by allowing the pneumatic lifting chamber to remain closed even when the angle of incidence of the aircraft and its height above ground vary. According to said modification, the slat 4 and flap 5 cooperate with the lower sections 22 of the partitions 3. The flap 5 is pivotally secured to the rear of the lower surface of the wing 2 and is folded back rearwardly under normal flight conditions.

FIGS. 9 and 10 illustrate a further embodiment of movable lateral partitions adapted in particular for use in the case of a wingless vehicle or of an aircraft the wings of which lie at a high level. In order to provide a pneumatic lifting chamber, the lower part of the vehicle is provided with an auxiliary wing or projection acting as an actual wing. The lateral partitions 3 extend then along the extreme edges of said auxiliary wing 2. They are bestowed with reference to said wings with two degrees of freedom since they can revolve round a shaft 31 fitted on a carriage 32, which latter can execute in its turn a transverse movement along a slideway 33 provided at the end of said auxiliary wing. It will furthermore be remarked that the movement of said partition is kinematically associated with that of the slat 4 and flap 5, as provided by the shafts 34 and 35 rigid respectively with the slat and with the flap.

The projecting ends of said shafts revolve in bearings 36 and 37 adapted to slide in slideways 38 provided in the lower sections of the partitions 3. Ties 39 and 40 may be provided for staying the two partitions 3 with reference to each other so as to allow them to resist lateral stresses due to the higher pressure prevailing in the chamber.

The manner of obtaining fluid-tightness will now be disclosed, the chamber being first closed by bringing the lower edges of the lateral partitions 3 and of the front and rear transverse partitions 4 and 5 into contact with ground. To this end, yielding drip flaps are fitted along the lower edges of said partitions preferably through rivetting or gluing. Such drip flaps are constituted for instance by wear-resisting rubber.

FIG. 11 shows such drip flaps 26 and 27 secured respectively along the outer edges of the nose 4 and flap 5.

Figure 12:
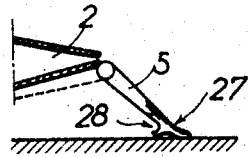
FIG. 12 is a view similar to FIG. 11 showing a modification of the fluidtight means at the aft of the chamber.

The front drip flap 26 is bent towards the inside of the chamber under the action of the forward movement of the aircraft and its lower edge tangent to the ground engages the latter by reason of the higher pressure prevailing in the chamber. This ensures a self-sealing of said chamber. The drip flap 27 is also incurved under the action of the said forward movement but this time towards the outside of the chamber. Said drip flaps ensure fluid-tightness since they are urged against the ground as provided by jacks acting on the slat 4 and flap 5 as disclosed hereinafter with reference to FIGS. 18 and 19. The drip flap 27 may be provided with a projecting ridge 28 facing inwardly of the chamber as illustrated in FIG. 12. Said drip flaps may thus be self-sealing as is also the case for the drip flap 26 by reason of its shape.

Figure 13:
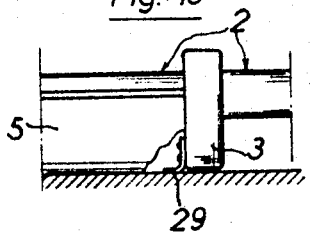
FIG. 13 is a view of the rear of a lifting chamber showing in partial sectional view a fluidtight packing carried by a lateral partition.

FIG. 13 illustrates a drip flap 29 similar to the drip flap just described and secured to a lateral partition 3 along a line adjacent its lower edge, said drip flap 26 facing the inside of the chamber so as to cooperate in the self-sealing of said chamber between said partition and ground.

Figure 14:
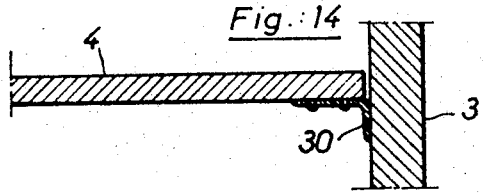
FIG. 14 is a horizontal sectional view showing the fluid-tightening means between a lateral partition and a fore or aft flap.

The self-sealing of the chamber between the partitions 3 on the one hand and the slat, wing and transverse rear flap on the other hand may be similarly obtained by means of shaped packings. Such a packing is illustrated at 30 in FIG. 14 which shows how fluid-tightness can be obtained between a lateral partition 3 and the front slat 4 when thhe angular setting of the slat varies. Of course, it is possible to resort to any known type of packing such as a packing fitted in the cooperating parts or else a packing constituted by an inflated elongated air chamber.

Figure 15:
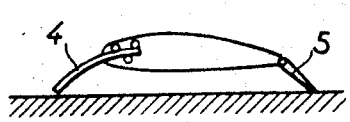
FIG. 15 is a diagrammatic side view of a modified front flap or slat in its operative position.
Figure 15A:
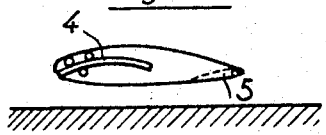
FIG. 15a is a view similar to FIG. 15 showing the same slat in its inoperative position.
Figure 16:
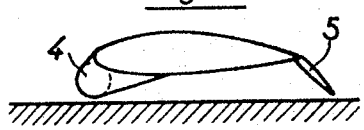
FIG. 16 is a diagrammatic side view of a further modification of the slat in its operative position.
Figure 16A:
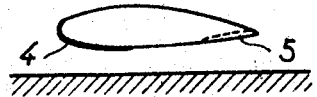
FIG. 16a is a view similar to FIG. 16 showing the same slat in its inoperative position.

The slat 4 and rear flap 5 illustrated in the precedingly described figures are pivotally secured to the leading edge and to the trailing edge of the wing. As shown in particular in FIG. 11, they may be folded into an inoperative position so as to collapse within the outline of said wing as illustrated in dotted lines in FIG. 11. However, it is also possible to imagine that under normal flight conditions the flap 5 forms part of the trailing edge of the wing. Instead of being pivotally mounted, the slat 4 and flap 5 may as well be fitted slidingly on the wing, as shown diagrammatically in FIGS. 15 and 15a illustrating a slat 4 respectively in its operative or displayed position and in its inoperative or collapsed position. Lastly, it is also possible to design a front slat formed by an inflatable tube as illustrated diagrammatically in FIGS. 16 and 16a showing such a slat respectively in its operative and in its inoperative position.

Figure 17:
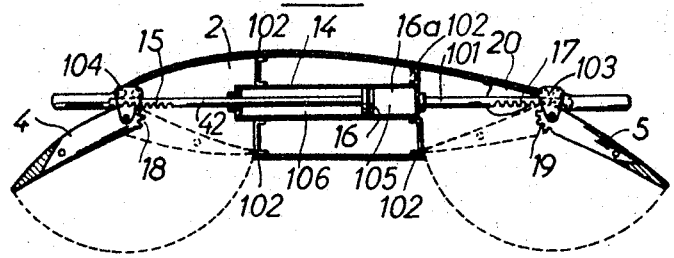
FIG. 17 illustrates diagrammatically an arrangement for the simultaneous control of the front and rear flaps closing the lifting chamber.

Controllable means kinematically connecting with one another the slat 4 and flap 5 are illustrated by way of example in FIG. 17. Said slat and flap are each revolvably carried round an axis parallel with the span of the aircraft. One or more longitudinally shiftable jacks such as 14 provide for their display and collapse. The jack 14 includes a piston 16 movable in a cylinder 16a dividing the inner space of said cylinder in two chambers 105 and 106. The cylinder 16a is a sliding fit in frame elements 102 belonging to the wing structure and is thus also movable. The piston 16 is solid with a piston rod 42 including a rack portion 15, whereas the cylinder 16a is solid with a cylinder rod 101 including a rack portion 17. Said racks engage toothed sections shown at 18 and 19 and are respectively rigid with the slat 4 and the flap 5, whereby the position of said slat and flap may be controlled. However, said control may be exerted as well through a system of links and levers. The slat 4 and rear flap 5 are normally folded during flight underneath the lower surface of the wing 2.

The rod 101 is guided by the parts 102 of the wing structure and by rollers 103 carried by said structure and similar to rollers 104 guiding the piston rod 42. Whenever fluidum under pressure is supplied, for example, to the cylinder chamber 105, the piston 16 is moved to the left, and the cylinder 16a is moved to the right, whereby the slat 4 and the flap 5 are drawn nearer to one another (and conversely), as illustrated diagrammatically in FIGURES 21 and 22. For a given relative position of the piston 16 and the cylinder 16a, the distance between the slat 4 and the flap 5 remains constant, so that if, for instance the slat 4 "closes" as indicated by the arrow G, the piston 16 and the cylinder 16a ared rawn together to the left, whereby the flap 5 "opens" as indicated by the arrow H.

Since the jack 14 acts both through its piston and through its cylinder, the pneumatic lifting chamber remains closed fore and aft when the angular setting of the aircraft varies without it being necessary to modify expansion of the jack 14 as clearly shown in a diagrammatic manner in FIGS. 19 and 20. In contradistinction, when the height of the wing above ground level varies, it is necessary, if the chamber is to remain closed both to the front and to the rear, for the relative angular setting of the slat with reference to the flap to be modified; in other words, it is necessary to adjust expansion of the jack which allows consequently obtaining the different relative positions of the parts as illustrated diagrammatically in FIGS. 21 and 22.

Figure 18:
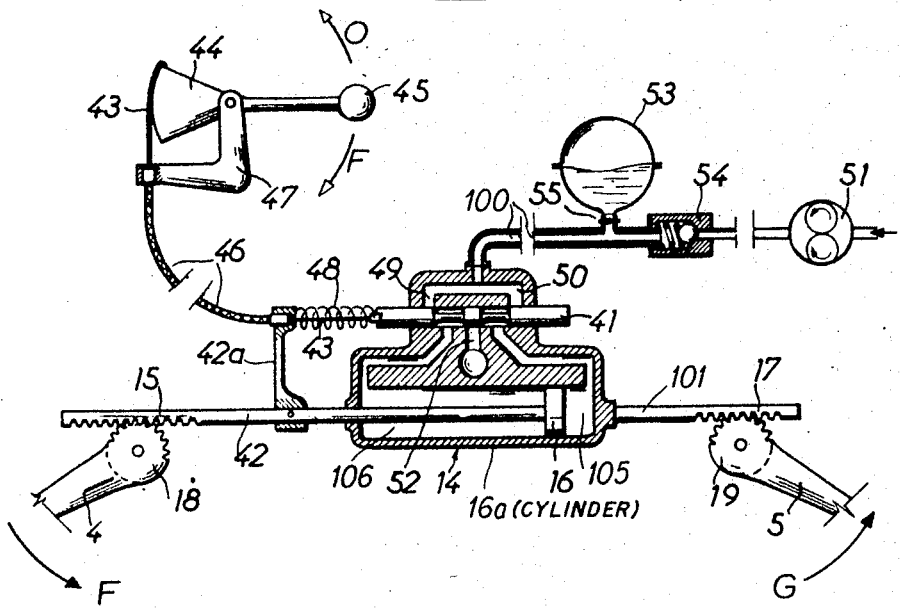
FIG. 18 illustrates a jack adapted to control the arrangement illustrated in FIG. 17.

FIG. 18 illustrates an embodiment of a controlled jack and of the control means associated therewith with a view to ensuring the desired result. According to a conventional arrangement, the two chambers 105, 106 of the jack 14 which are separated by the piston 16 are connected with the corresponding chambers of a distributor having a slide valve 41 which is actuated by the rod 42 of the piston 16 through the agency of a bracket 42a rigid with said rod. By way of example, there is illustrated a control system including a sheathed cable 43 connecting the slide valve 41 with a sector 44 adapted to pivot in unison with the control lever 45. A spring 48 compresses the cable sheath 46 between the bracket 42a and the support 47 on which the control lever is pivotally carried. Said arrangement operates as follows:

The ports 49 and 50 of the distributor are connected through a flexible duct 100 with a pump 51 delivering oil under pressure, while the medial port 52 of the distributor is connected with a container not illustrated feeding the pump. It is apparent that to each position of the control lever 45 there corresponds a position of the piston 16 in the jack and consequently a relative angular setting of the slat with reference to the rear flap, since the latter parts are rigid respectively with the above-described pinions 18 and 19.

An arrangement is provided in order that the angular setting of the slat with reference to the flap 5 may for the open position illustrated in FIG. 17 increase without any shifting of the lever 45 controlling said setting. The arrangement considered allows making the chamber act no longer only as a lifting means, but also as a pneumatic shock absorber; this becomes possible since the lifting chamber is now fluidtightly closed with reference to ground and operates thus in a manner different from the conventional air cushions.

In order that said chamber may act as a shock absorber in the manner referred to, an auxiliary hydropneumatic accumulator or storing chamber 53 and a nonreturn flap valve 54 are provided in the circuit connecting the distributor with the oil-feeding pump 51. When the vehicle impinges against ground, the pressure increases in the lifting chamber, the nose and flap move apart, the piston 16 is urged slightly towards the cylinder bottom while the slide valve 41 of the distributor is shifted slightly towards the right-hand side of FIG. 18, whereby the cylinder bottom communicates with the port 50. Oil is thus urged back into the storing means 53. The increase of the angular setting of the slat with reference to the flap 5 is thus limited by the increased pressure obtained in said storing chamber. A throttled passage 55 in the connection between the circuit and said storing chamber allows adjusting the damping effect obtained.

In the preceding applications, it has been assumed that the taking off and landing of the vehicle are executed on a ground which is smooth enough for the fluidtightness of the chamber not to be disturbed. The taking off and landing surface need not in fact be very firm and it may be constituted by a sheet of water. However, the invention does not exclude the possibility of landing even on a rough ground, and it is sufficient to this end to supply the lifting chamber with larger amounts of compressed gas, so as to make up for the leaks which may in such a case be more considerable. This may be obtained very simply by means of special gas generators constituted for instance by powder charges the duration of combustion of which is suitably adjusted. Said powder charges may be located at the point designated by the reference number 7 in FIG. 3. Generally speaking and with a view to increasing the action of the lifting chamber, even on a rough or uneven ground, it is possible for the chamber to be in all cases inflated to a substantial extent. Such an inflation would then be superabundant in the case of a smooth runway by reason of the high grade of the fluid tightness provided by such a runway. In order that the variations in pressure in the chamber may be the same when the nature of the ground varies, it is possible to provide an exhaust valve limiting the pressure in said chamber. Said valve is illustrated at 90 in FIG. 23. It is loaded by a spring 91 so as to open when the pressure in the chamber rises above the value defined by the gauging of the spring. Said valve may also be adapted to play the part of a pressure regulator by controlling the gauging of the spring by the instantaneous position of the aircraft above ground at the moment of landing and possibly by the speed and acceleration of its downward movement. Said parameters may be transmitted by means 92 associated with a feeler 93 of the type used for similar purposes on wheeled undercarriages. Said arrangement allows a damping of the downward movement upon impact with the ground, which is always the same, whatever the uneveness of ground may be.

In order to illustrate the large field of possible applications of the arrangement forming the object of said invention, FIGS. 24 to 26 show such an application of the improved lifting pneumatic chamber to a vehicle the bulk of which is similar to that of an automobile. Said vehicle includes chiefly a flying wing 2 the aspect ratio of which is less than unity and the original features of which form no part of the invention and it may as well move along a road or even a sheet of water or fly.

FIGS. 24 to 26 show as precedingly a wing 2 extending between two lateral partitions 3 and provided with a slat 4 to the front and with a rear flap 5, said slat and flap being pivotally secured at their outer ends to the wing. The lateral partitions which have been illustrated only diagrammatically are of the type bestowed with reference to the wing with at least one and preferably two degrees of freedom, as disclosed above, so as to allow them to assume a vertical movement or a modification in the angle of incidence. In order to further the understanding of FIG. 24, the left-hand partition 3 is supposed to be transparent. The wing 2 is balanced and stabilized by a horizontal tail unit 69 carried by two fins 70 as clearly shown in FIG. 25. The aircraft is propelled by a propelling group 71 including an expansion turbine actuating through a speed reducer the actual propeller 72 extending between the two fins which protect it. The turbine is fed by a gas generating turbine 7 illustrated in FIG. 26. The gases passing out of the said generator feed also the lifting chamber and an air slot 9 in the rear flap 5. The steering is performed through the agency of the flaps 73 and 74 while the vertical piloting is obtained by the flaps 75 and 76 and the piloting against rolling is obtained by a differential action on said flaps. It is possible to associate with said piloting means a reaction produced by jets of gas fed by the generator 7.

Slots similar to the slot 9 may be provided for this purpose at suitable points of the vehicle. The compressed fluid may be fed into said slots under the control of a conventional distributor operatively connected with the control of the rudders so as to provide any desired evolution chiefly at ground level. Auxiliary means provide if required for the running of the vehicle over ground. Said means include for instance two rear wheels 77 and 78 and a front wheel 79 swivelling for this purpose round a pivot 80. The front wheel 78 is carried by the slat 4 and is therefore also collapsible.

The amplitude of the angular shifting of the front wheel 79 round its pivot 80 is selected so as to be equal to at least 180°. It is preferably for the ratio between the wheel base and the gauge of the vehicle to be as small as possible so that the vehicle which cannot execute any rearward motion may turn round within a space as reduced as possible.

I claim:

1. A vehicle including a frame provided on its underside with a ground-effect pneumatic lifting plenum chamber bounded laterally by two opposite partitions extending in substantially vertical longitudinal planes and the lower portions of which form ground-engaging edges, said partitions being expansible in their own plane, at least in their portions including the ground-engaging edges, whereby said edges may engage the ground surface whatever may be the position of the vehicle with reference to the ground; two movable transverse partitions engaging substantially fluid-tightly the longitudinal partitions and bounding the plenum chamber fore and aft; and means kinematically connecting said transverse partitions with one another in a manner such that the opening of one of them produces the closing of the other and conversely.

2. A vehicle as claimed in claim 1, further comprising an elastic member inserted in said kinematic connecting means.

3. A vehicle as claimed in claim 1, further comprising a fluid-operated jack inserted in said kinematic connecting means and a circuit feeding fluid to the jack; said jack including a cylinder and a piston connected respectively with the one and with the other of the two movable transverse partitions.

4. A vehicle as claimed in claim 3, further comprising a pneumatically controlled storing chamber inserted in the circuit feeding fluid to the jack.

5. A flying machine adapted to take-off and land on a pneumatic lifting plenum chamber, including a frame carrying a wing system provided underneath its lower surface with a ground-effect pneumatic lifting plenum chamber bounded laterally by two opposite partitions extending in substantially vertical longitudinal planes and the lower parts of which form ground-engaging edges, said partitions being expansible in their own plane, at least in their portions including the ground engaging edges, whereby said edges may engage the ground-surface whatever may be the relative position of the flying machine with reference to ground at the moment of its taking off and landing; two movable transverse partitions engaging substantially fluid-tightly the longitudinal partitions and bounding the plenum chamber fore and aft; and means kinematically connecting said transverse partitions with one another in a manner such that the opening of one of them produce the closing of the other and conversely.

6. A flying machine as claimed in claim 5, further comprising an elastic member inserted in said kinematic connecting means.

7. A flying machine as claimed in claim 5, further comprising a fluid-operated jack inserted in said kinematic connecting means and a circuit feeding fluid to the jack; said jack including a cylinder and a piston connected respectively with the one and with the other of the two movable transverse partitions.

8. A flying machine as claimed in claim 7, further comprising a pneumatically controlled storing chamber inserted in the circuit feeding fluid to the jack.

References Cited

UNITED STATES PATENTS

| | | | |
|---|---|---|---|
| 1,536,283 | 5/1925 | Breguet | 244—100 |
| 2,631,794 | 3/1953 | Warner. | |
| 3,070,327 | 12/1962 | Dornier et al. | 244—12 |
| 3,082,976 | 3/1963 | Dornier | 244—12 |
| 3,146,752 | 9/1964 | Ford | 180—126 XR |
| 3,258,079 | 6/1966 | Hopkins | 180—128 |

MILTON BUCHLER, Primary Examiner

P. E. SAUBERER, Assistant Examiner

U.S. Cl. X.R.

180—126